United States Patent [19]
Buck et al.

[11] Patent Number: 5,266,252
[45] Date of Patent: Nov. 30, 1993

[54] CERAMIC SLIP CASTING TECHNIQUE

[75] Inventors: Gregory M. Buck; Peter Vasquez, both of Newport News, Va.

[73] Assignee: The United States of America as rperesented by the Administrator of the National Aeronautics and Space Administration, Washington, D.C.

[21] Appl. No.: 950,580

[22] Filed: Sep. 22, 1992

[51] Int. Cl.$^5$ .............................................. C04B 33/28
[52] U.S. Cl. ....................................... 264/86; 264/221
[58] Field of Search ................................... 264/86, 221

[56] References Cited

U.S. PATENT DOCUMENTS

| | | |
|---|---|---|
| 2,494,403 | 1/1950 | Nies et al. |
| 4,067,943 | 1/1978 | Ezis ........................ 264/221 |
| 4,338,272 | 7/1982 | Pelton et al. |
| 4,556,528 | 12/1985 | Gersch et al. |
| 4,659,526 | 4/1987 | Shimaguichi et al. |
| 4,812,278 | 3/1989 | Natori ..................... 264/221 |
| 5,159,970 | 11/1992 | Burkarth .................. 264/221 |

*Primary Examiner*—James Derrington
*Attorney, Agent, or Firm*—George F. Helfrich

[57] ABSTRACT

An improved process for slip casting ceramic articles that does not employ parting agents and affords the casting of complete, detailed, precision articles that do not possess parting lines. A wax pattern for a shell mold is provided, and an aqueous mixture of a calcium sulfate-bonded investment material is applied as a coating to the wax pattern. The coated wax pattern is then dried, followed by curing to vaporize the wax pattern and leave a shell mold of the calcium sulfate-bonded investment material. The shell mold is cooled to room temperature, and a ceramic slip is poured therein. After a ceramic shell of desired thickness has set up in the shell mold, excess ceramic slip is poured out. While still wet, the shell mold is peeled from the ceramic shell to expose any delicate or detailed parts, after which the ceramic shell is cured to provide a complete, detailed, precision ceramic article without parting lines.

5 Claims, No Drawings

CERAMIC SLIP CASTING TECHNIQUE

ORIGIN OF THE INVENTION

The invention described herein was made by employees of the U.S. Government and may be used by and for the Government for governmental purposes without the payment of any royalties thereon or therefor.

BACKGROUND OF THE INVENTION

1. Field of the Invention

This invention relates generally to the slip casting of ceramic articles, i.e., the process of forming ceramic articles by pouring a ceramic slip (e.g., a mixture of finely-divided fused silica and water having the consistency of cream) into a plaster of paris mold, followed by firing to produce the finished article. In particular, the invention relates to an improved ceramic slip casting method which employs a flask molding material for non-ferrous metals, viz., a calcium sulfate-bonded investment containing calcinated silica and glass fibers, as a shell mold instead of plaster of paris.

2. Description of the Related Art

A primary concern in modern fluid dynamics research is the experimental verification of computational aerothermodynamic codes. This research requires high precision and detail in the test model employed. Ceramic materials are used for these models because of their low heat conductivity and their survivability at high temperatures. To fabricate such models, slip casting techniques were developed to provide net-form, precision casting capability for high-purity ceramic materials in aqueous solutions.

Casting of ceramic models was desired over machining, since a cast model can be easily and inexpensively replicated. However, because of the brittleness of ceramic models, many are broken in the rough testing environment, before, during, and after wind-tunnel runs. The art of slip casting was developed for this reason. Slip casting was found to provide superior results over other ceramic casting techniques, such as hydraulic casting. The plaster mold draws out moisture through the mold interface, pulling or sucking the slip material into the desired shape. This removes air gaps, and the slip has minimum shrinkage from the mold during setup. In fact, a plaster mold will grow when cured, and many times this will completely compensate for shrinkage in the slip material.

In these previous slip casting techniques, block, or flask molds made of plaster-of-paris were used to draw liquid from the slip material. Upon setting, parts were removed from the flask mold and cured in a kiln at high temperatures. Casting detail was usually limited with this technique—detailed parts were frequently damaged upon separation from the flask mold, as the molded parts are extremely delicate in the uncured state, and the flask mold is inflexible. Ceramic surfaces were also marred by "parting lines" caused by mold separation. This adversely affected the aerodynamic surface quality of the model as well. (Parting lines are invariably necessary on or near the leading edges of wings, nosetips, and fins for mold separation. These areas are also critical for flow boundary layer control.)

Parting agents used in the casting process also affected surface quality. These agents eventually soaked into the mold, the model, or flaked off when releasing the cast model. Different materials were tried, such as oils, paraffin, and even an algae. The algae released best, but some of it remained on the model and imparted an uneven texture and discoloration on the model surface when cured. Unavailable in the prior art was a technique providing for the casting of complete, detailed, precision models without parting lines or the use of parting agents.

U.S. Pat. No. 4,659,526 is directed to a forming method and a mold wherein a slip is cast into the mold, and the mold is removed after hardening of the slip. The mold is patterned by the use of a water-soluble binder, and it absorbs a water content in the slip to soften itself and become easy for removal. This mold is made of refractories other than calcium, and there is no mention of employing such material in a shell mold application.

U.S. Pat. No. 4,556,528 is directed to a method and apparatus for the casting of fragile complex shapes. However, the mold material employed is a wax, which cannot be used to draw liquid from a ceramic slip.

U.S. Pat. No. 4,338,272 is directed to a slip casting system which employs a nonplaster, viz., ceramic powder, for the mold. Although this system provides for the easy removal of large areas of the molded article, it will not work well with detailed shapes, as the mold is rigid.

U.S. Pat. No. 2,494,403 is directed to a molding composition for ceramic slip casting which is a high performance plaster type material. However, this mold material hardens when wet (no detail may be cast) and weakens when hot (no wax pattern may be made).

Accordingly, it is a primary object of the present invention to provide what is not available in the art, viz., an improved ceramic slip casting technique which affords the casting of complete, detailed, precision articles without parting lines or the use of parting agents, the articles being especially suitable as wind tunnel models for use in the experimental verification of computational aerothermodynamic codes.

SUMMARY OF THE INVENTION

This primary object, as well as other objects and their attending benefits, are achieved by the provision of a ceramic slip casting process which employs a flask molding material for non-ferrous metals. This material, which is a calcium sulfate-bonded investment containing calcinated silica and glass fibers is used as a shell mold instead of plaster of paris.

It was found that this material draws liquid from an aqueous slip, similar to the action of plaster-of-paris. Also, in its cured state this mold will draw liquid from non-aqueous slips as well, since the mold itself does not contain water as does typical plaster. In the present application the investment material is applied as a stucco or shell mold. This investment withstands much higher temperatures than plaster, and becomes weak when wetted, which is the opposite behavior of plaster. By unconventional use of this material, as both a shell mold (as opposed to a flask mold) and for slip casting ceramics (as opposed to non-ferrous metals), the desired casting results were achieved.

In the procedure of the present invention, a lost-wax technique is used to create a shell mold. The calcium sulfate-bonded investment material is applied to a wax pattern, dried, and cured to vaporize the wax from the mold. The mold is then cooled to room temperature and used for slip casting. While still wet, the calcium sulfate-bonded investment shell can be peeled off the model to free delicate parts such as nose tips, fins, or winglets.

This process allows for casting of complete, precision models with detailed parts. The models do not have parting lines or surface impurities caused by mold separation. While developed for models to be used in wind-tunnel tests, the ability to cast complex parts in a precise manner has many other applications, such as forming superconducting ceramic components from non-aqueous slip solutions. Moreover, there will be many more application when ceramic materials are further developed for high strength/temperature applications, such as engine parts.

DESCRIPTION OF THE PREFERRED EMBODIMENTS

The present invention involves an entirely new use of a material normally used for flask molding of non-ferrous metals. This material, a calcium sulfate-bonded investment containing calcinated silica and glass fibers, may be obtained as "909 Investment" from Ransom and Randolph (R&R) of Maumee, Ohio. This investment was found to draw moisture from a ceramic slip similar to plaster. It also was found to withstand much higher temperatures than plaster does, and it becomes weak when wet, which is opposite to plaster. By unconventional use of this material as a shell mold (as opposed to its normally intended use as a flask mold) in the slip casting of ceramics, as opposed to non-ferrous metals, the desired objects of the invention are achieved. The investment material employed had the following composition: cristobalite (sintered silica quartz), approximately 35% wt. mulite (alumina/silica), approximately 35% wt., calcium sulfate, approximately 30% wt., and glass fibers ≦0.05% wt.

According to the present invention, a lost-wax technique was used to create a shell mold, which had all the detail of the original wax pattern. "909 Investment" from Ransom and Randolph was mixed in the proportion of 28 parts by weight of water to 100 parts by weight of investment powder. This mixture was applied by brushing or daubing on the wax pattern to a thickness of 0.25 to 0.5 inches. After slow drying at room temperature, or in an oven at 200° F., the mold and wax were cured at 1000° F. to vaporize the wax from the mold. Conventional casting plaster cannot survive this temperature treatment. Therefore, detailed molds requiring a lost-wax process could not be made prior to this invention. The mold was then cooled to room temperature and used for slip casting. Since no shelling "system" presently exists for the 909 Investment, it was applied somewhat unevenly. This did not affect results, as long as the minimum thickness of the application did not fall below 0.25 inches. A slurry mixture, similar to the fused silica ceramic shell systems available commercially, could well improve production.

A ceramic slip was provided, as is well known in the art. To support the shell during a slip pour, it was packed in a box of silica sand. During early development of the present invention, the entire box of sand with the mold was tipped to pour out excess slip material before the slip had completely set up. Later, a fused silica ceramic shell was added over the 909 Investment shell before curing out the wax to create an "eggshell" on the mold for added strength. With this "eggshell", the mold was removed safely from the sand between slip pours to empty excess slip material from the mold before the slip had completely set up. Especially good results were obtained when the ceramic slip was composed of fused silica quartz.

After the slip had set up to its green strength, at room temperature, the mold could be safely handled. While still wet, the investment shell was peeled off the model to free delicate parts such as nose tips, fins, or winglets, so that uneven thermal expansion between the model and shell during curing would not damage these parts. Over large areas the shell mold was left on for curing as desired to provide additional support, since the thin mold shell would give before the model during a cure cycle. When using high purity fused silica quartz as the ceramic slip material, the model was cured to 2250° F. For even temperature curing, the model was packed in a fused silica sand in the kiln. If desired, a model sting may be placed in the model shell, and the model shell may be back-filled with a hydraulically-setting ceramic. Finally, if desired, the model may be sprayed with phosphors in a binder so that the model may be employed in applications using optical fluorescence thermography.

Finally, additional features, such as hatch openings, can be molded into the shell models using lightweight, removable mold pieces, such as hardened foam.

We claim:

1. A process for slip casting ceramic articles having detailed parts without the use of parting agents, which process affords the casting of complete, detailed, precision articles that do not possess parting lines, the process comprising:
   providing a wax pattern for a shell mold;
   applying to the wax pattern a coating of an aqueous mixture of a calcium sulfate-bonded investment material containing calcinated silica and glass fibers to form a coated wax pattern;
   drying the coated wax pattern, followed by curing thereof to vaporize the wax pattern and leave a shell mold of the calcium sulfate-bonded investment material containing calcinated silica and glass fibers;
   cooling the shell mold to room temperature;
   providing a ceramic slip and pouring the ceramic slip into the shell mold, followed by pouring out excess ceramic slip after a ceramic shell of desired thickness has set up in the shell mold;
   peeling the shell mold while still wet from the ceramic shell to expose the detailed parts; and
   curing the ceramic shell to provide a complete, detailed, precision ceramic article without parting lines.

2. The process of claim 1, wherein the ceramic slip comprises an aqueous mixture of fused silica quartz.

3. The process of claim 1, wherein the aqueous mixture contains calcium sulfate-bonded investment powder which is sintered quartz and the material comprises 28 parts by weight of water for every 100 parts by weight of calcium sulfate-bonded investment powder.

4. The process of claim 3, wherein the aqueous mixture of the calcium sulfate-bonded investment material is applied to the wax pattern to produce a coating thickness of at least 0.25 inches.

5. The process of claim 4, wherein the dried, coated wax pattern is cured at a temperature of about 1000° F. to vaporize the wax pattern and leave a shell mold of the calcium sulfate-bonded investment material.

* * * * *